US012683227B2

(12) United States Patent
Marpu et al.

(10) Patent No.: US 12,683,227 B2
(45) Date of Patent: Jul. 14, 2026

(54) BATTERY PACK WITH ENERGY ABSORBING END PLATE

(71) Applicants: Amar Marpu, Canton, MI (US); Joshua Putman Styron, Canton, MI (US)

(72) Inventors: Amar Marpu, Canton, MI (US); Joshua Putman Styron, Canton, MI (US)

(73) Assignee: FORD GLOBAL TECHNOLOGIES, LLC., Dearborn, MI (US)

( * ) Notice: Subject to any disclaimer, the term of this patent is extended or adjusted under 35 U.S.C. 154(b) by 582 days.

(21) Appl. No.: 18/309,856

(22) Filed: May 1, 2023

(65) Prior Publication Data

US 2024/0372196 A1 Nov. 7, 2024

(51) Int. Cl.
| | |
|---|---|
| *H01M 50/242* | (2021.01) |
| *B60R 16/04* | (2006.01) |
| *H01M 50/204* | (2021.01) |
| *H01M 50/249* | (2021.01) |

(52) U.S. Cl.
CPC ........... *H01M 50/242* (2021.01); *B60R 16/04* (2013.01); *H01M 50/204* (2021.01); *H01M 50/249* (2021.01); *H01M 2220/20* (2013.01)

(58) Field of Classification Search
CPC ............. H01M 50/242; H01M 50/204; H01M 50/249; H01M 2220/20; H01M 50/209; H01M 50/244; H01M 50/289; B60R 16/04; Y02E 60/10; B60K 1/04; B60L 50/64; B60L 50/66

See application file for complete search history.

(56) References Cited

U.S. PATENT DOCUMENTS

| | | | | |
|---|---|---|---|---|
| 2011/0200860 | A1* | 8/2011 | Brodie | B60L 1/003 |
| | | | | 429/120 |
| 2021/0344057 | A1* | 11/2021 | Seo | H01M 50/211 |
| 2022/0271382 | A1* | 8/2022 | Akutsu | H01M 50/264 |
| 2023/0318114 | A1* | 10/2023 | Taniuchi | H01M 50/233 |
| | | | | 429/50 |
| 2023/0335846 | A1* | 10/2023 | Jeon | B60L 50/64 |

FOREIGN PATENT DOCUMENTS

| | | | | | |
|---|---|---|---|---|---|
| CN | 111416167 | A | * | 7/2020 | .......... H01M 50/209 |
| CN | 211879464 | U | | 11/2020 | |
| DE | 102012214443 | A1 | * | 2/2014 | .......... H01M 50/242 |
| JP | 2022078379 | A | * | 5/2022 | .......... H01M 50/209 |

* cited by examiner

*Primary Examiner* — Muhammad S Siddiquee
(74) *Attorney, Agent, or Firm* — David B. Kelley; Brooks Kushman P.C.

(57) ABSTRACT

An end plate for a vehicle battery pack is specially designed to span multiple rows of battery cells and to protect the cells if an object strikes the side of the vehicle. The end plate includes a curved front wall, a flat rear wall, and several cantilevered struts perpendicular to the rear walls. The cantilevered struts are dimensioned such that they buckle to absorb energy rather than transmitting force to the battery cells.

14 Claims, 5 Drawing Sheets

BATTERY PACK WITH ENERGY ABSORBING END PLATE

TECHNICAL FIELD

The present disclosure relates to battery pack for an electrified vehicle. More particularly, the disclosure relates to a multi-row battery pack with an energy absorbing end plate.

BACKGROUND

An electrified vehicle includes at least one electric motor that provides vehicle propulsion to either supplement or replace a conventional internal combustion engine. Electrified vehicles depend on storage of energy in a form that can be rapidly converted to electrical energy for use by the motor. Typically, energy is stored in chemical form in a battery pack, such as a Lithium Ion battery pack. For a given battery technology, storing more energy requires a larger volume of batteries and may require packaging the batteries in new locations in the vehicle.

SUMMARY

A vehicle battery pack includes a plurality of rows of battery cells and a structured end plate. The of the rows of battery cells contains a plurality of battery cells. The rows of battery cells may include two outside rows and at least one interior row between the outside rows. The end plate may have a preload such that it exerts more force against the interior row than against the outside rows. The structured end plate is in contact with an end cell of each of the rows of battery cells. The end plate includes a front wall, a rear wall, and a plurality of cantilevered struts extending between the front wall and the rear wall perpendicular to the rear wall. Each cantilevered strut has a respective thickness and width measured from the front wall to the rear wall wherein the width is at least three times the thickness. The plurality of cantilevered struts may include a top cantilevered strut, a bottom cantilevered strut and a center cantilevered strut. The front wall may be curved such that the width of the center cantilevered strut exceeds the width of the top cantilevered strut and the width of the bottom cantilevered strut. Side plate may be attached to each end of the end plate. The side plates may be under tension such that they exert force on the end plate to hold the end plate against the end cells.

A vehicle includes front wheels, rear wheels, and a battery pack longitudinally located between the front wheels and the rear wheels. The battery pack includes a plurality of rows of battery cells extending laterally across the vehicle. The battery packs also includes two end plates, one on each end of the rows of battery cells. Each of the end plates has a front wall, a rear wall, and a plurality of cantilevered struts extending between the front wall and the rear wall perpendicular to the rear wall. Each cantilevered strut has a width measured from the front wall to the rear wall which is at least three times its thickness. The plurality of cantilevered struts may include a top cantilevered strut, a bottom cantilevered strut and a center cantilevered strut. The front wall may be curved such that the width of the center cantilevered strut exceeds the width of the top cantilevered strut and the width of the bottom cantilevered strut. Two side plates may be attached to respective ends of the end plates. Each side plate may be under tension such that the side plates exert force on the end plate to hold the end plate against the battery cells.

The rows of battery cells may include two outside rows and at least one interior row between the outside rows. The end plates may have a preload such that they exert more force against the interior row than against the outside rows.

An end plate for a vehicle battery pack includes a front wall, a rear wall, and a plurality of cantilevered struts. The struts extend between the front wall and the rear wall perpendicular to the rear wall. Each cantilevered strut has a width measured from the front wall to the rear wall which is at least three times its thickness. The plurality of cantilevered struts may include a top cantilevered strut, a bottom cantilevered strut and a center cantilevered strut. The front wall may be curved such that the width of the center cantilevered strut exceeds the width of the top cantilevered strut and the width of the bottom cantilevered strut. The end plate may be curved such that it is concave towards the front wall.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
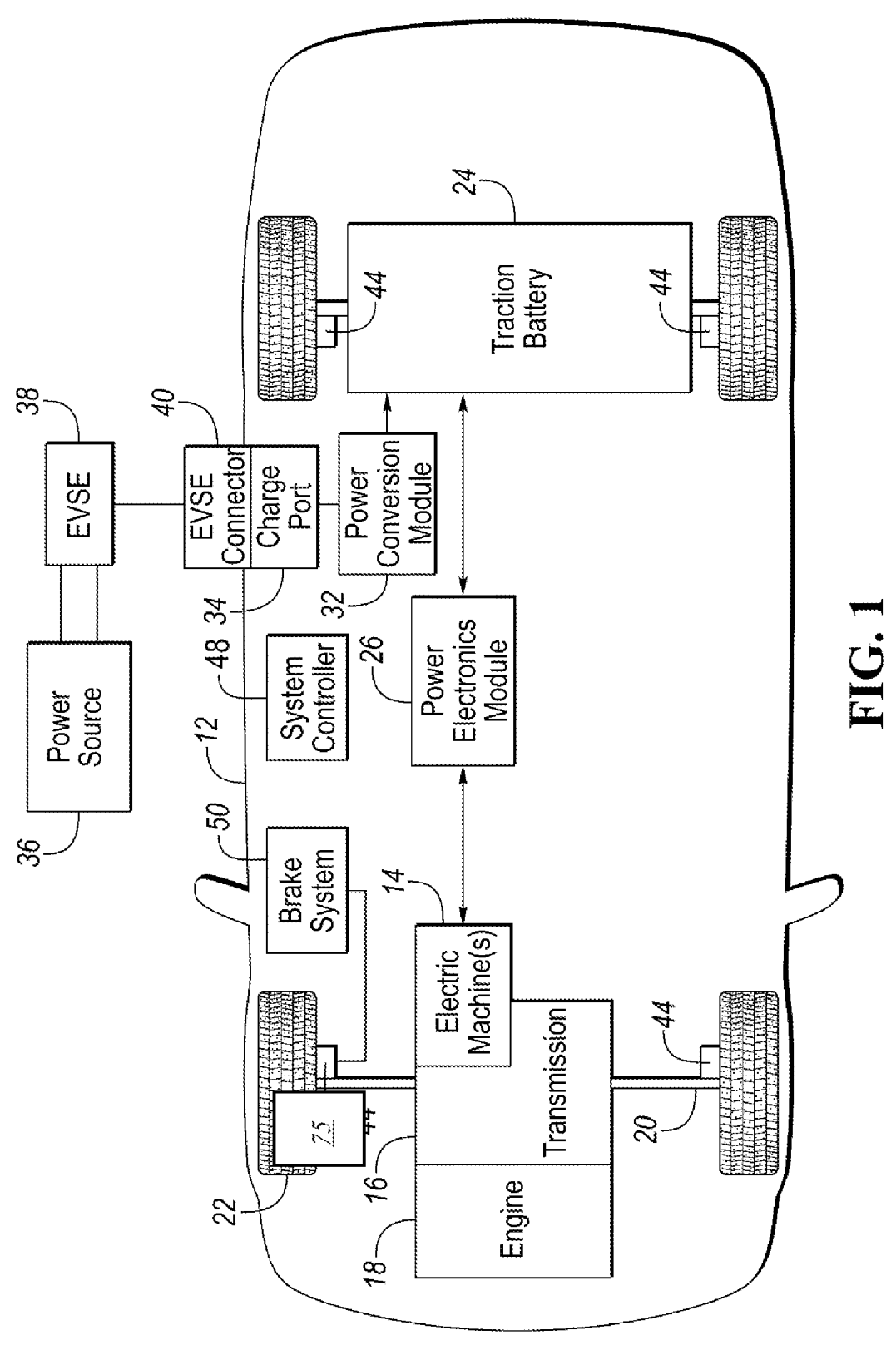
FIG. 1 is a block diagram of an electric vehicle.

Referring now to FIG. 1, a block diagram of an exemplary electric vehicle ("EV") 12 is shown. In this example, EV 12 is a plug-in hybrid electric vehicle (PHEV). EV 12 includes one or more electric machines 14 ("e-machines") mechanically connected to a transmission 16. Electric machine 14 is capable of operating as a motor and as a generator. Transmission 16 is mechanically connected to an engine 18 and to a drive shaft 20 mechanically connected to wheels 22. Electric machine 14 can provide propulsion and slowing capability while engine 18 is turned on or off. Electric machine 14 acting as a generator can recover energy that may normally be lost as heat in a friction braking system. Electric machine 14 may reduce vehicle emissions by allowing engine 18 to operate at more efficient speeds and allowing EV 12 to be operated in electric mode with engine 18 off under certain conditions.

A traction battery 24 ("battery) stores energy that can be used by electric machine 14 for propelling EV 12. Battery 24 typically provides a high-voltage (HV) direct current (DC) output. Battery 24 is electrically connected to a power electronics module 26. Power electronics module 26 is electrically connected to electric machine 14 and provides the ability to bi-directionally transfer energy between battery 24 and the electric machine. For example, battery 24 may provide a DC voltage while electric machine 14 may require a three-phase alternating current (AC) voltage to function.

Power electronics module 26 may convert the DC voltage to a three-phase AC voltage to operate electric machine 14. In a regenerative mode, power electronics module 26 may convert three-phase AC voltage from electric machine 14 acting as a generator to DC voltage compatible with battery 24.

Battery 24 is rechargeable by an external power source 36 (e.g., the grid). Electric vehicle supply equipment (EVSE) 38 is connected to external power source 36. EVSE 38 provides circuitry and controls to control and manage the transfer of energy between external power source 36 and EV 12. External power source 36 may provide DC or AC electric power to EVSE 38. EVSE 38 may have a charge connector 40 for plugging into a charge port 34 of EV 12. Charge port 34 may be any type of port configured to transfer power from EVSE 38 to EV 12. A power conversion module 32 of EV 12 may condition power supplied from EVSE 38 to provide the proper voltage and current levels to battery 24. Power conversion module 32 may interface with EVSE 38 to coordinate the delivery of power to battery 24. Alternatively, various components described as being electrically connected may transfer power using a wireless inductive coupling.

Wheel brakes 44 are provided for slowing and preventing motion of EV 12. Wheel brakes 44 are part of a brake system 50. Brake system 50 may include a controller to monitor and control wheel brakes 44 to achieve desired operation.

The various components discussed may have one or more associated controllers to control and monitor the operation of the components. The controllers can be microprocessor-based devices. The controllers may communicate via a serial bus (e.g., Controller Area Network (CAN)) or via discrete conductors. For example, a system controller 48 (i.e., a vehicle controller) is present to coordinate the operation of the various components.

As described, EV 12 is in this example is a PHEV having engine 18 and battery 24. In other embodiments, EV 12 is a battery electric vehicle (BEV). In a BEV configuration, EV 12 does not include an engine.

Figure 2:
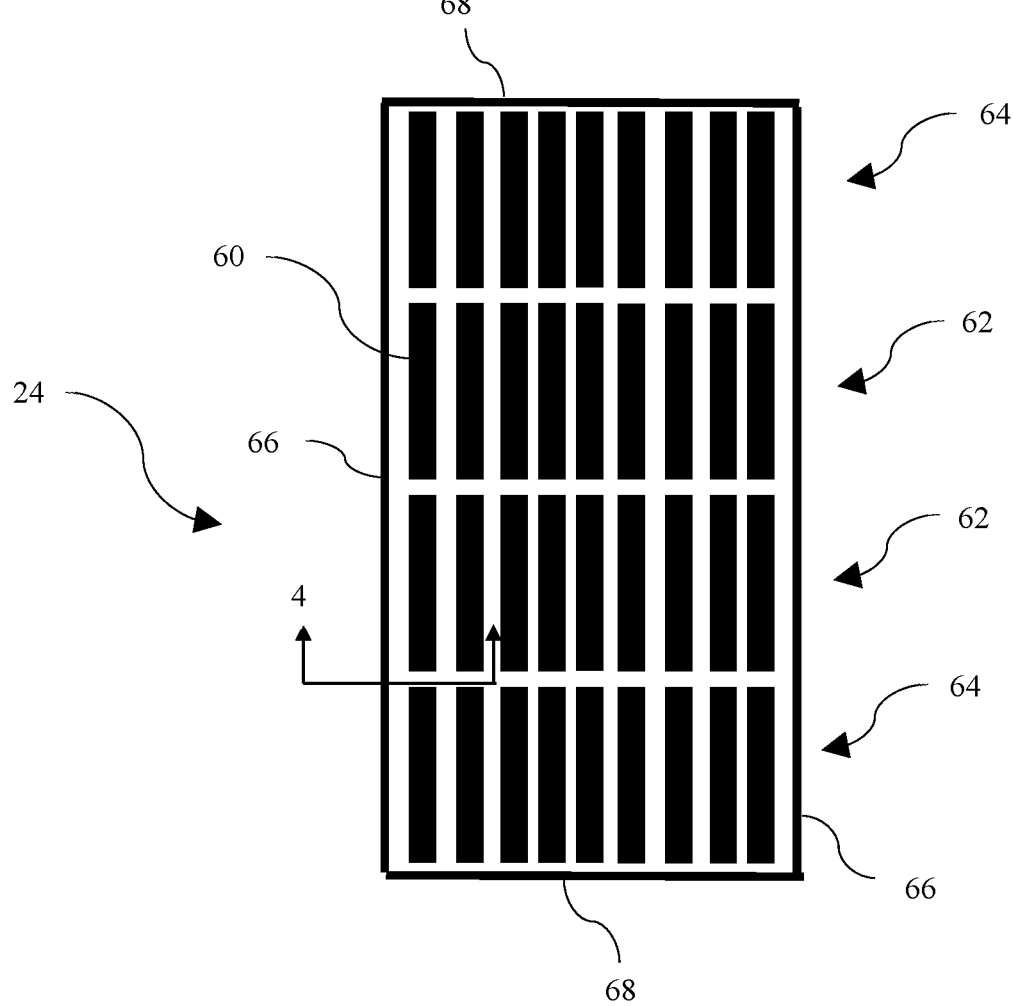
FIG. 2 is a top schematic view of a vehicle battery pack.

Referring now to FIG. 2, battery pack 24 includes a number of battery cells 60. The battery cells 60 are arranged in a number of rows, including interior rows 62 and outside rows 64. End plates 66 are held against the ends of the row by side plates 68. This keeps the battery cells in compression.

Figure 3:
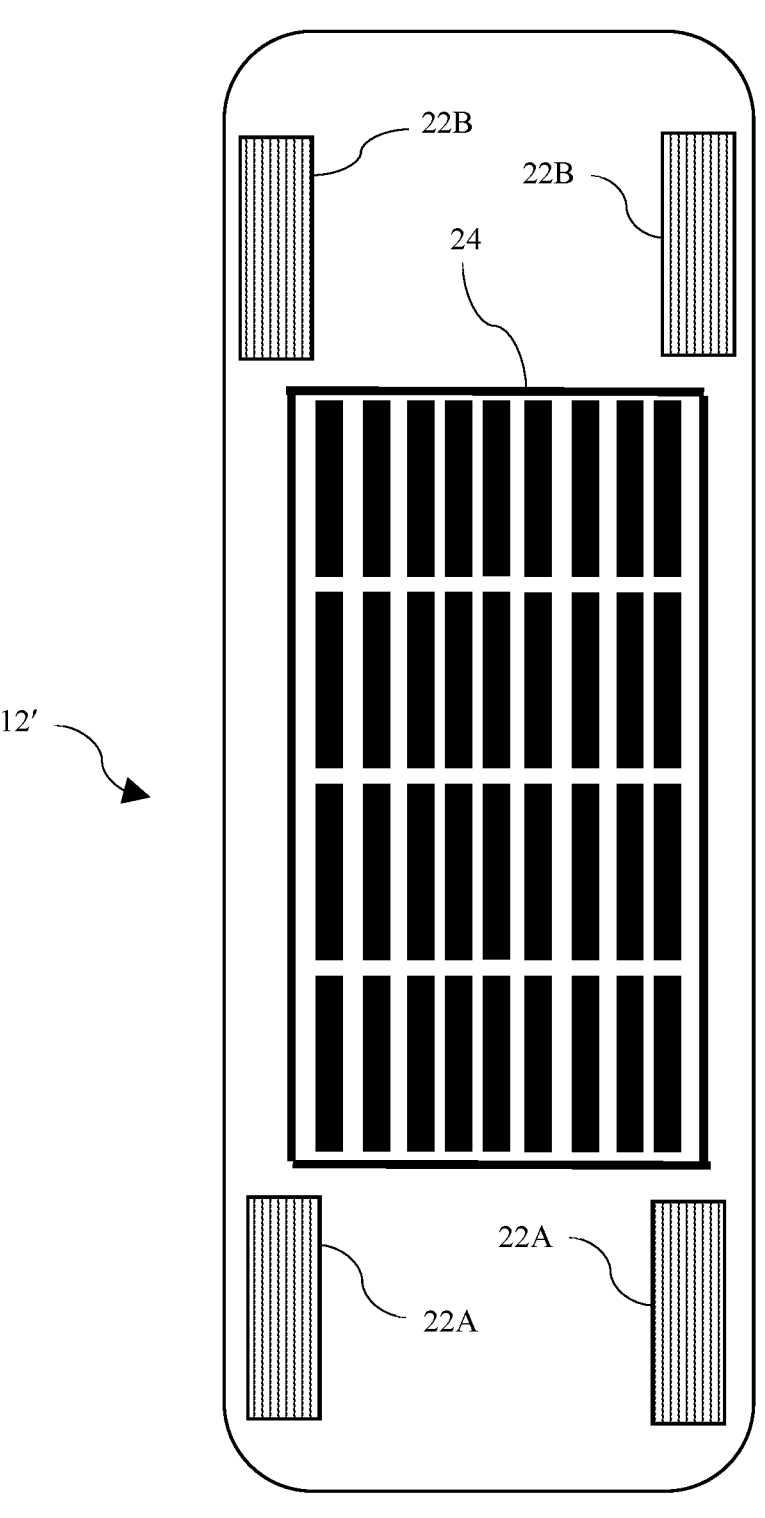
FIG. 3 is a schematic top view of an electric vehicle including the battery pack of FIG. 2.

Although the battery pack is shown between the rear wheels in FIG. 1, it may be located in other parts of the vehicle. For example, battery pack 24 may be located longitudinally between the front wheels 22A and the rear wheels 22B, as shown in FIG. 3. In certain situations, an object may forcefully encounter the area between the wheels. It is beneficial if the end-plate is designed to reduce the likelihood of the object damaging the battery cells.

Figure 4:
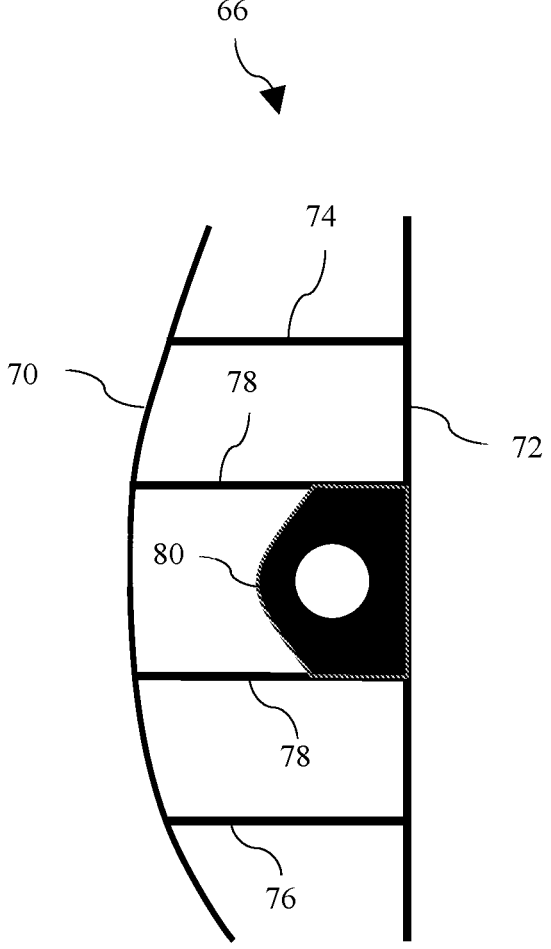
FIG. 4 is a cross sectional view of one of the end plates of the battery pack of FIG. 2.

FIG. 4 shows a cross section of an end plate 66 designed to absorb energy to protect the battery cells. End plate 66 includes a front wall 70, a rear wall 72, a top cantilevered strut 74, a bottom cantilevered strut 76, and three center cantilevered struts. The cantilevered struts extending between the front wall 70 and the rear wall 72 perpendicular to the rear wall. Each cantilevered strut has a respective thickness and a respective width measured from the front wall to the rear wall. The width of each cantilevered strut is at least three times the corresponding thickness. Two connectors 80, one at each end of end plate 66, connect the end plate to the side plates 68.

If an object impinges upon the front wall 70, the cantilevered struts 74-78 tend to buckle. As the cantilevered struts buckle, they absorb energy and substantially reduce the amount of force and energy that is transmitted to the rear wall and from there to the battery cells. If the walls were thicker relative to their width, they would be less likely to buckle and more likely to transmit force to the rear wall and the battery cells. Also note that the front wall 70 is curved. If the object is not vertical, a curved wall distributes the load more evenly across the face of the battery cells, whereas a straight wall would tend to focus the force towards either the top of the cell or the bottom of the cell. Also, it is more likely to distribute the force across several cantilevered struts. The curve is not necessarily a continuous curve, but may instead be a series of straight segments that approximate a curve.

Figure 5:
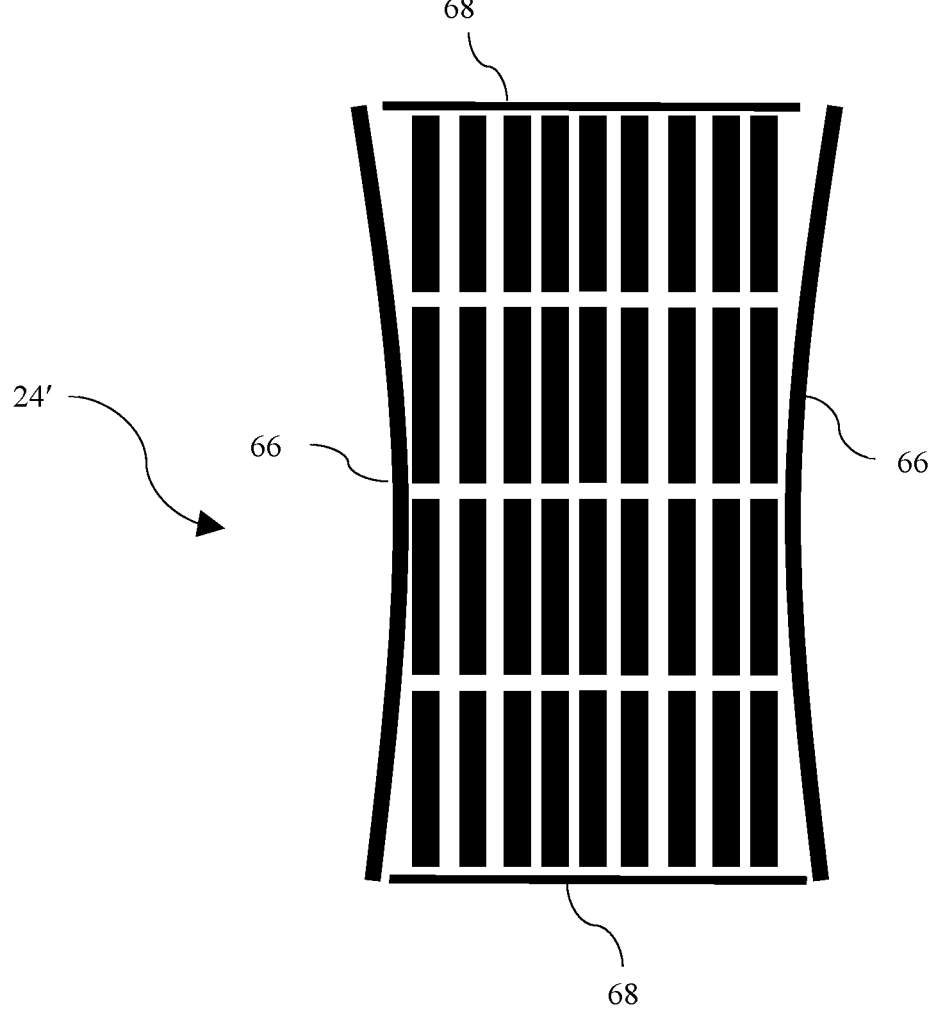
FIG. 5 is a top view of the battery pack of FIG. 2 before the end plates are connected to the side plates.

FIG. 5 illustrates the battery pack 24' during assembly before the side plates 68 are attached to connectors 80. Note that, in a free position, end plate 66 is curved along its lengthwise axis. This is done to evenly distribute the compressive force among the rows at point in the life of the battery pack. A compressive pre-load is applied to the rows of battery cells as the ends of the end plate 66 are forced into the assembled position. At the time of assembly, the pre-loaded end plate exerts more compressive force against the interior rows of battery cells than against the outside rows of battery cells. In use, the battery cells tend to expand, increasing the compressive force in all of the rows. However, the end plate is less rigid over the interior rows due to the increased distance from the side plates. Therefore, the compressive force increases less due to cell expansion in the interior rows than in the outside rows. The greater pre-load over the interior rows tends to equalize the total compressive force across the different rows of battery cells.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A vehicle battery pack comprising:
a plurality of rows of battery cells, each row containing a plurality of battery cells; and
a structured end plate in contact with an end cell of each of the rows of battery cells, the end plate comprising a front wall, a rear wall, a top cantilevered strut, a bottom cantilevered strut and a center cantilevered strut, each cantilevered strut extending between the front wall and the rear wall perpendicular to the rear wall, each cantilevered strut having a respective thickness and having a respective width measured from the front wall to the rear wall, wherein the width is at least three times the thickness.

2. The vehicle battery pack of claim 1, wherein the front wall is curved.

3. The vehicle battery pack of claim 1, wherein the width of the center cantilevered strut exceeds the width of the top cantilevered strut and the width of the bottom cantilevered strut.

4. The vehicle battery pack of claim 1, further comprising two side plates, each side plate attached to a respective end of the end plate, each side plate under tension such that they exert force on the end plate to hold the end plate against the end cells.

5

5. The vehicle battery pack of claim 4, wherein:

the rows of battery cells include two outside rows and at least one interior row between the outside rows; and the end plate has a preload such that it exerts more force against the interior row than against the outside rows.

6. A vehicle comprising:

front wheels;

rear wheels; and a battery pack longitudinally located between the front wheels and the rear wheels, the battery pack comprising a plurality of rows of battery cells extending laterally across the vehicle, and two end plates, one on each end of the rows of battery cells, each of the end plates having a front wall, a rear wall, a top cantilevered strut, a bottom cantilevered strut, and a center cantilevered strut, each cantilevered strut extending between the front wall and the rear wall perpendicular to the rear wall, each cantilevered strut having a respective thickness and having a respective width measured from the front wall to the rear wall, wherein the width is at least three times the thickness.

7. The vehicle of claim 6, wherein the front wall is curved.

8. The vehicle of claim 6, wherein the width of the center cantilevered strut exceeds the width of the top cantilevered strut and the width of the bottom cantilevered strut.

9. The vehicle of claim 6, further comprising two side plates, each side plate attached to a respective end of the end plates, each side plate under tension such that they exert force on the end plate to hold the end plate against the battery cells.

10. The vehicle of claim 9, wherein:

the rows of battery cells include two outside rows and at least one interior row between the outside rows; and the end plates have a preload such that they exert more force against the interior row than against the outside rows.

11. An end plate for a vehicle battery pack, the end plate comprising:

a front wall;

a rear wall; and a plurality of cantilevered struts extending between the front wall and the rear wall perpendicular to the rear wall, each cantilevered strut having a respective thickness and having a respective width measured from the front wall to the rear wall, wherein the width is at least three times the thickness.

12. The end plate of claim 11, wherein the front wall is curved such that it is concave toward the rear wall.

13. The end plate of claim 11, wherein the plurality of cantilevered struts include a top cantilevered strut, a bottom cantilevered strut and a center cantilevered strut, and the width of the center cantilevered strut exceeds the width of the top cantilevered strut and the width of the bottom cantilevered strut.

14. The end plate of claim 11, wherein the end plate is curved such that it is concave towards the front wall.

\* \* \* \* \*